Dec. 8, 1936.　　　J. F. THOLL　　　2,063,472
CENTRIFUGAL SEPARATOR
Filed Feb. 8, 1934　　　3 Sheets—Sheet 1

INVENTOR:
John F. Tholl,
BY
ATTORNEY.

Dec. 8, 1936.  J. F. THOLL  2,063,472
CENTRIFUGAL SEPARATOR
Filed Feb. 8, 1934  3 Sheets-Sheet 2
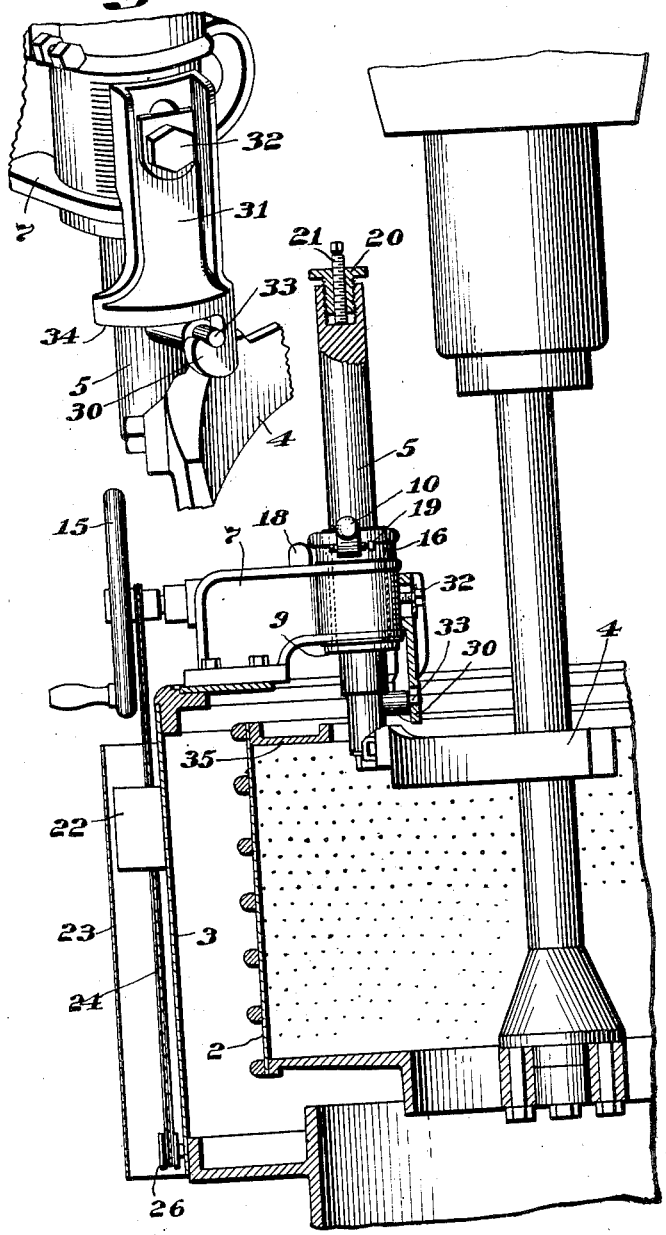
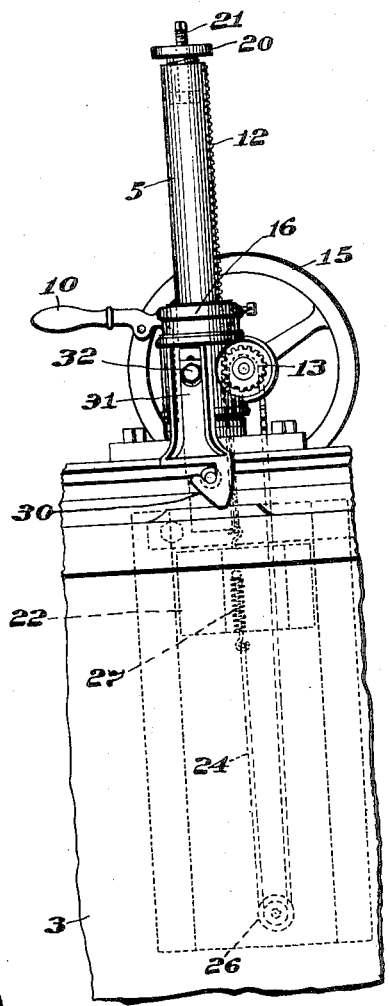
INVENTOR:
John F. Tholl,
BY J.H. McCready,
ATTORNEY.

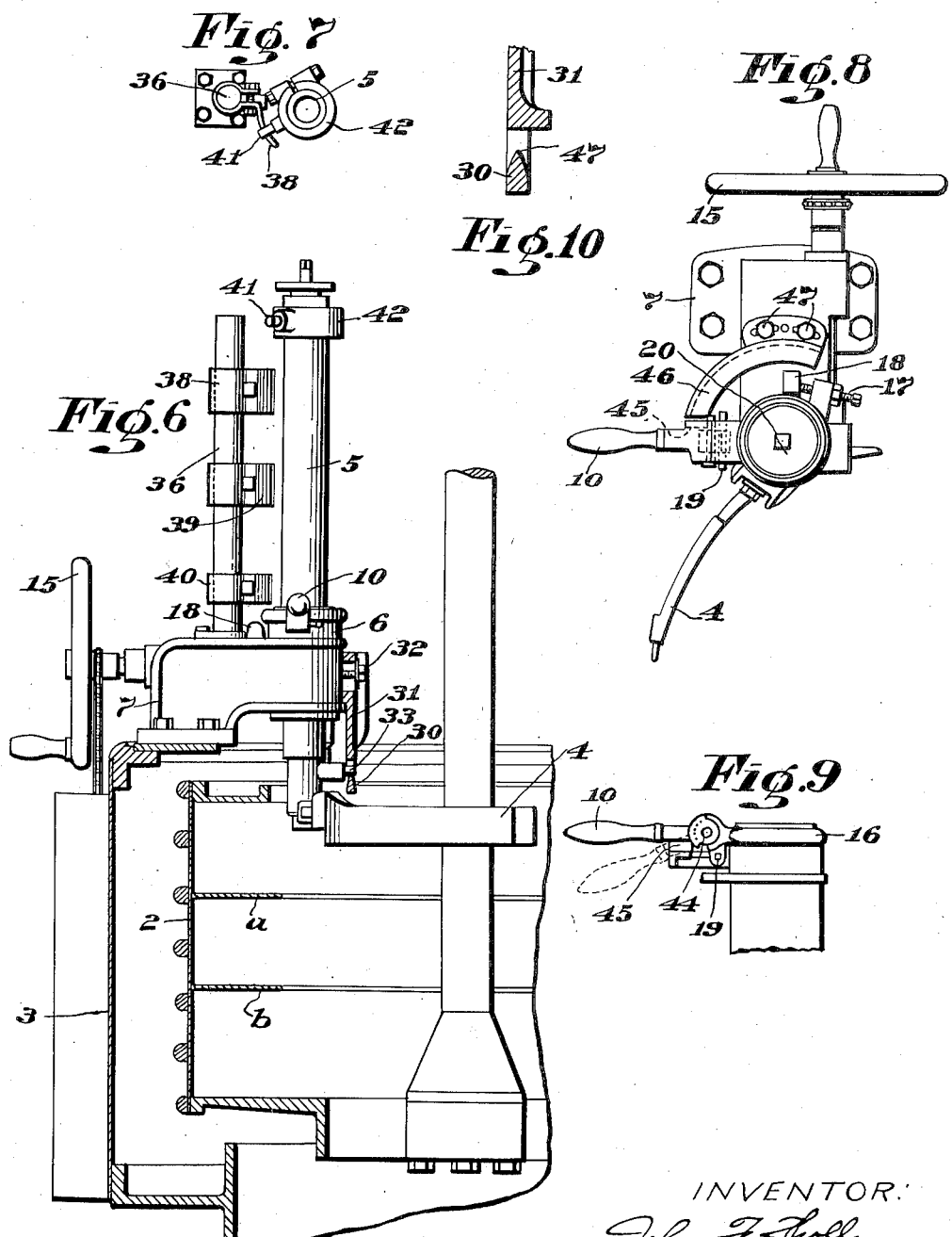

Patented Dec. 8, 1936

2,063,472

UNITED STATES PATENT OFFICE 2,063,472

CENTRIFUGAL SEPARATOR

John F. Tholl, Needham, Mass., assignor to American Tool & Machine Co., Hyde Park, Boston, Mass., a corporation of Massachusetts Application February 8, 1934, Serial No. 710,269

6 Claims. (Cl. 210—70)

This invention relates to centrifugal separators, and is more especially concerned with the unloading or discharging mechanisms of machines of this type.

It is a common practice to equip a centrifugal separator with a scraper or plow, and to so support this member that it can be moved into and out of the basket and, while in the basket, can be forced into the material deposited on the inner wall of the basket and can also be traversed parallel to said wall. This scraper is used to plow out the material collected on the wall of the basket and thus to effect the discharge of this material so as to prepare the machine for operation on an additional batch of material. After the discharging operation has been completed, the scraper is raised out of the basket and is usually supported on the casing or curbing of the machine while it is idle.

The present invention aims to improve the supporting and guiding mechanisms for dischargers of this general type with a view to facilitating the operation of them, preventing their accidental displacement while idle, minimizing the danger of damaging the basket, and providing more effective and accurate control over this element of the machine.

The nature of the invention will be readily understood from the following description when read in connection with the accompanying drawings, and the novel features will be particularly pointed out in the appended claims.

In the drawings,

Fig. 3 is a vertical, sectional view of the portion of the machine illustrated in Fig. 1;

Fig. 4 is a side view of a portion of said machine;

Fig. 5 is a perspective view of the rest or support for holding the scraper in its idle position;

Fig. 6 is a view similar to Fig. 3 illustrating the invention as applied to a basket provided with baffles;

Fig. 7 is a plan view of the guiding mechanism shown in Fig. 6;

Fig. 8 is a plan view showing an additional arrangement for locking the scraper in its idle position;

Fig. 9 is a side elevation of a part of the apparatus shown in Fig. 8; and

Fig. 10 is a vertical, sectional view through the hook.

Figure 1:
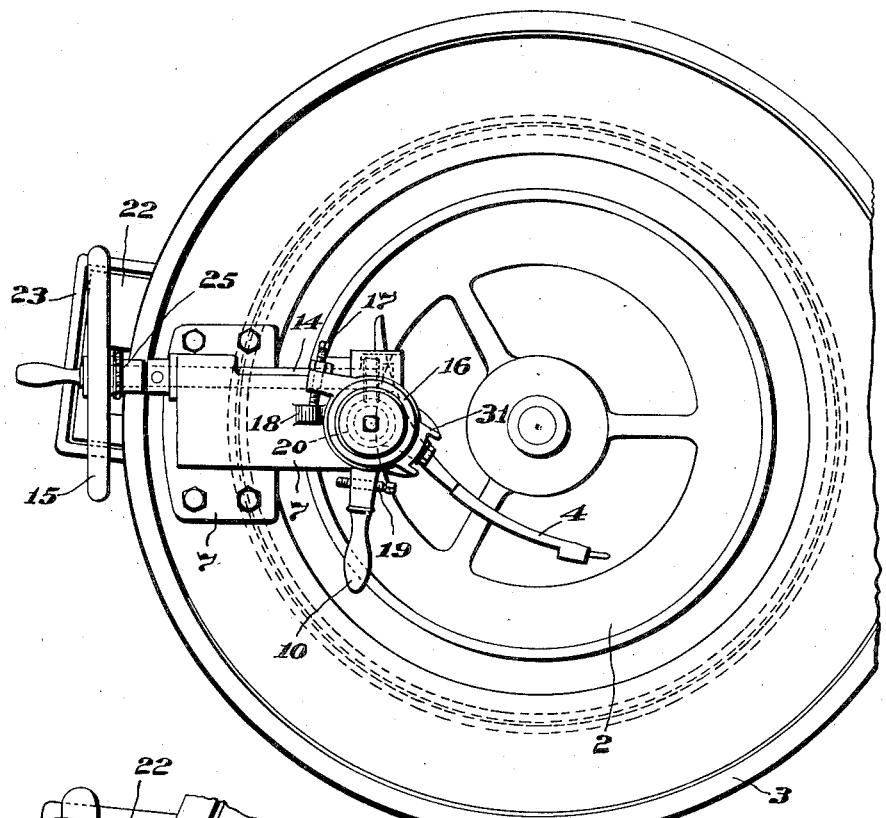
Figure 1 is a plan view of a portion of a centrifugal separator constructed in accordance with this invention.

The machine shown in the drawings comprises a basket 2 mounted to revolve about an upright axis and partly enclosed in a casing 3. These parts may be of any suitable construction.

The unloading or discharging mechanism provided by this invention comprises a scraper 4 secured on the lower end of an upright post or shaft 5. This shaft is arranged to slide vertically through a sleeve 6 which is supported in a bracket 7 that is bolted to the top of the machine curb or casing. A nut 9 threaded on the lower end of the sleeve effectually resists any upward thrust on the sleeve. This sleeve may be rotated in the bracket and it is splined to the shaft 5 so that the shaft and the scraper are compelled to rotate with the sleeve, notwithstanding the fact that the shaft slides freely through the sleeve. For this purpose the shaft is grooved longitudinally, as shown in the drawings, and a key or spline 8 that is secured to the sleeve runs in said groove. At its upper end the sleeve 6 is enlarged to overlie the adjacent portions of the bracket 7, and a handle 10 is secured rigidly to this upper portion of the sleeve. Consequently, by moving the handle 10 the scraper may be swung into any desired position within its range of movement.

Figure 2:
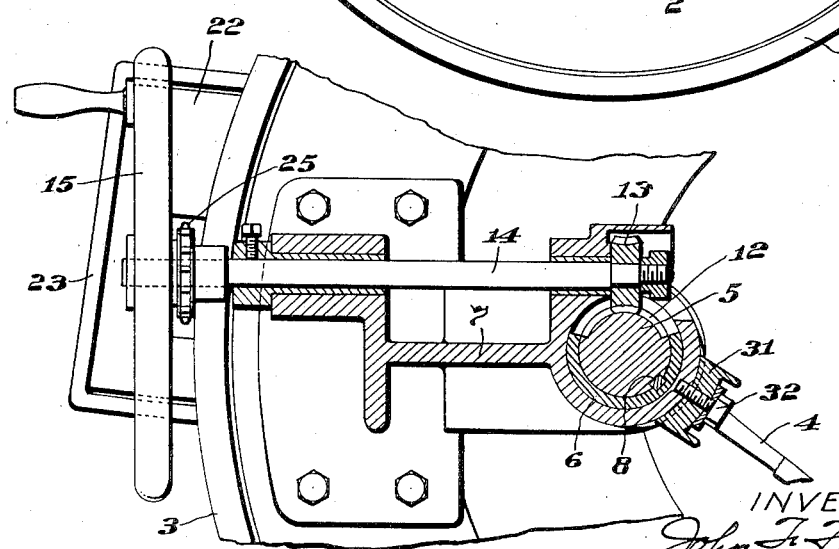
Fig. 2 is a plan view, partly in horizontal section, illustrating certain details of the construction shown in Fig. 1.

For the purpose of raising and lowering the scraper a series of rack teeth 12 are cut in one side of the shaft 5, such teeth extending only part way around the circumference of the shaft, and a pinion 13 is arranged to mesh with these teeth and to drive the rack, the pinion being secured on the end of a horizontal shaft 14 to the opposite end of which the hand wheel 15 is fastened. Suitable bearing bushings in the bracket 7 operatively support the shaft 14. As shown in Fig. 2, the teeth of the pinion 13 are cut on a radius having its center in the axis of the sleeve 8 and shaft 5 so that the operative engagement of the pinion with the teeth of the rack is not disturbed by the swinging movement of the shaft around its axis. Also, as indicated in said figure, the sleeve is recessed or cut away to admit the pinion 13, the pinion acting on the rack in a region opposite to that in which the shaft is backed up or bears against the sleeve so that the shaft is effectually supported against any thrust exerted on it by the pinion. So far as the foregoing features are concerned, the machine shown is substantially like that disclosed in my copending application Serial No. 662,306.

In using this discharger the workman stands beside the machine and, by operating the handle 10, holds the scraper at the desired radial distance from the wall of the basket while with the other hand he operates the hand wheel 15 to give the scraper its vertical traversing movement. In order to limit the movement of the scraper toward the wall of the basket, a ring 16 is secured rigidly to a portion of the sleeve 6 which projects above the bracket, the ring, if desired, being made integral with the handle 10, and this ring carries a stop screw 17 arranged to engage a stationary lug 18 projecting upwardly from the bracket 7. Another stop screw 19 threaded through a lug projecting downwardly from the handle is arranged to engage with the opposite side of said lug. Consequently, by properly adjusting these screws both the inward and outward movements of the scraper may be limited, as desired.

The downward or lowering movement of the scraper 4 is adjustably limited by a stop 20, Figs. 1, 3 and 4, which preferably consists of a nut threaded into the upper end of the shaft 5, and provided with a head somewhat larger in diameter than the shaft, so that when this shaft is forced downwardly to the lower limit of its movement, the head of the nut 20 will strike the upper end of the bushing 6 and prevent further movement in this direction. Ample adjustment of the stop 20 is provided by the construction just described, and the stop may be locked in its adjusted position by means of a set screw 21 which is threaded axially through the nut and bears on the bottom of the socket formed in the upper end of the shaft to receive the nut.

For the purpose of reducing the effort required to raise and lower the scraper, it is substantially counter-balanced by a weight 22 arranged to slide in a vertically disposed casing or guideway 23 secured to the side of the main casing or curbing 3. This weight is secured to one end of a chain 24 which runs over a sprocket wheel 25 secured fast on the shaft 14, and is also guided on a pulley 26 near the bottom of the casing 23, the opposite end of the chain being connected to the weight through a spiral spring 27 which serves to keep the chain tight.

A novel arrangement is provided for supporting the discharger in its inoperative or idle position. It comprises a hook 30, Figs. 3, 4 and 5, having a large shank 31 which is secured to the bracket 7 by means of a bolt 32, the shank of the hook being slotted to receive the bolt so that the hook can be vertically adjusted relatively to the bracket. In addition, the contacting faces of the shank and the bracket are grooved horizontally to cooperate with the bolt in holding the hook in any position of vertical adjustment. Cooperating with this hook is a pin 33 that is fixed securely in the shaft 5 and projects laterally therefrom. When the workman has completed the discharging operation he raises the scraper 4 by operating the hand wheel 15 and then, by turning the handle 10, swings the pin 33 into engagement with the hook 30, as shown in Figs. 4 and 5. The scraper thus is held in an elevated, idle, or inoperative position, in the basket where it does not interfere with any function of the machine, and in such a position that it can be quickly swung out of the hook and brought into operation again when desired. The fact that the scraper is supported in the basket during the period in which it is idle, is of advantage in reducing the time and labor involved in bringing the scraper into operation and throwing it out of action again, and particularly in reducing the over-all vertical dimensions of the space required by the machine, which frequently is a very important factor from a practical standpoint.

When such a scraper is to be used in a basket provided with baffles, as in the construction shown in Fig. 6, the matter of guiding the scraper by hand to cause it to perform its load discharging function thoroughly, while at the same time avoiding injury to the baffles, is made considerably more difficult. It is one of the objects of this invention to solve this problem.

In the arrangement illustrated in Figs. 3 to 6, the pin 33 and hook 30 are so located with reference to each other and to the basket, that the scraper is held at substantially the upper limit of its range of travel. When it is lifted to start the discharging or unloading operation, the upward movement of the pin 33 is limited by the lower surface 34, Fig. 5, of the guide 31, this surface being so positioned that when the scraper is swung outwardly its upper edge moves very close to the lower surface 35, Fig. 3, of the upper ring or head of the basket. As above explained, also, the stop screw 19 cooperates with the lug 18 to so limit the horizontal or outward movement of the scraper that its edge will not damage the wall of the basket. The downward movement of the scraper, in the construction shown in Figs. 3 and 4, likewise is limited by the adjustment of the stop 20.

In order to guide this scraper around the baffles $a$ and $b$, Fig. 6, a stationary guide or templet is mounted immediately beside the shaft 5 and on top of the bracket 7, this guide comprising a stationary post 36 and a plurality of guiding elements 38, 39 and 40 adjustably supported on this post, the number of these elements required depending upon the number of baffles in the basket. Each of the elements 38, 39 and 40 is made in the form of a split clamp, as best shown in Fig. 7, is secured on the post by a bolt, and it is also provided with a guiding wing or arm to engage a pin or roll 41 carried by a collar 42 that is clamped adjustably on the shaft 5.

In using this mechanism, the scraper is guided horizontally into its operative relationship by the pin 33 and lower surface 34 of the bracket 31, as above described, the workman producing this movement by swinging the handle 10. As he rotates the hand wheel 15 to feed the scraper downwardly, the pin 41 follows the movements of the scraper and strikes the upper edge of the guide 38 just before the scraper is lowered sufficiently to come in contact with the first baffle $a$. This guide compels the operator to swing the scraper outwardly far enough to clear the inner edge of the baffle before he can lower the scraper further. He next feeds the scraper down until the pin 41 clears the lower edge of the guide 38, after which he again swings the scraper outwardly, the pin 41 riding along the lower edge of the guide 38 during this movement. The width of this guide is made such that the upper edge of the scraper will slide under the baffle $a$ closely to the lower surface of said baffle as it is swung outwardly. The operator next feeds the scraper down toward the lower baffle $b$, but this feeding movement is arrested by the engagement of the pin 41 with the upper edge of the second guide 39 just before the scraper otherwise would strike the baffle. The operations above described are then repeated, the baffle being swung inwardly, while the pin 41 travels around the right-hand edge, Fig. 6, of the guide 39, after which the operator may again feed the scraper outwardly and down, thus cleaning out the lowermost compartment in the basket. Just before the scraper would strike the bottom of the basket, its downward feeding movement is arrested either by the engagement of the collar 42 with the bushing 6, or by the contact of the pin 41 with the lowermost bracket 40, depending upon the design of the guiding elements.

Such an arrangement, therefore, protects the basket and its baffles from injury by the scraper, while enabling the scraper to perform its load discharging functions. At the same time the adjustability of the guiding elements enables the operator to adapt the guiding mechanism to the internal construction of different baskets.

It is sometimes of advantage to indicate definitely to the workman when the scraper is located in its idle position with the pin 33 engaged in the notch of the hook 30. For this purpose an arrangement, such as that illustrated in Figs. 8 and 9, is useful. Here the handle 10 is hinged to the collar 16 by a pivot pin 44, and it is provided with a downwardly projecting lug 45 adapted to ride on the upper surface of an arcuate bracket 46 adjustably secured by bolts 47 to the top of the frame piece 7. The upper surface of this bracket is of such an angular extent that it supports the lug 45 throughout the entire operative range of movement of the scraper, holding the handle 10 in a horizontal position during this whole period of travel. When, however, the scraper is swung into its idle position, and the pin 33 is entered in the hook 30, the scraper then is at the inward limit of its range of travel, and just before it reaches this limit the lug 45 drops off the end of the bracket 46 by gravity and the handle swings down into the dotted line position in which it appears in Fig. 9. The operator then knows that the pin 33 is properly positioned in the hook. This dropping movement of the handle also serves as an additional means for locking the pin 33 in the hook 30, since the pin cannot be moved out of the hook without raising the handle 10 far enough to lift the lug 45 above the level of the upper surface of the bracket 46.

Preferably the upper edge of the slot in the hook 30 across which the pin 33 rides is made very narrow or thin, as indicated at 47 in Fig. 10, so that sugar or other material undergoing treatment in the basket cannot collect and build up on this surface.

While I have herein shown and described a preferred embodiment of my invention, it will be understood that this embodiment may be modified without departing from the spirit or scope of the invention.

Having thus described my invention, what I desire to claim as new is:

1. In a centrifugal separator, the combination with a basket mounted for rotation about an upright axis, a scraper for acting on the material in said basket, means for supporting said scraper for movement in the basket both toward and from the wall of the basket and also parallel to said wall, said basket being provided with baffles, a hand wheel for moving said scraper vertically, and a hand lever for swinging the scraper toward and from said wall, of guiding means for so limiting the movements of said scraper both horizontally and vertically as to protect the basket from injury by said scraper, while enabling the scraper to perform its load discharging functions.

2. In a centrifugal separator, the combination with a basket mounted for rotation about an upright axis, a scraper for acting on the material in said basket, means for supporting said scraper for movement in the basket both toward and from the wall of the basket and also parallel to said wall, said basket being provided with baffles, of additional stationary means cooperating with said scraper supporting means for guiding the movements of said scraper both horizontally and vertically to compel the movement of said scraper around said baffles while it is operated to perform its load discharging functions.

3. A centrifugal separator according to preceding claim 2, in which said guiding means includes a templet, and a guiding element movable with the scraper and cooperating with the templet to control the movements of said scraper.

4. In a centrifugal separator, the combination with a basket mounted for rotation about an upright axis, said basket being provided with baffles, and a scraper for acting on the material in said basket, of mechanism including an upright shaft for supporting said scraper for movement both toward and from the wall of said basket and also parallel to said wall, means associated with said shaft and operable through it to give said scraper its load discharging movements, an upright stationary guide located adjacent to said shaft, and a guiding element carried by said shaft and cooperating with said stationary guide to so direct the movements of said scraper as to protect said baffles from injury by said scraper while enabling the scraper to perform its load discharging functions.

5. In a centrifugal separator, the combination with a basket mounted for rotation about an upright axis, said basket being provided with baffles, and a scraper for acting on the material in said basket, of mechanism including an upright shaft for supporting said scraper for movement both toward and from the wall of said basket and also parallel to said wall, manually operated devices connected with said shaft and operable through it to give said scraper its load discharging movements, a post located beside said shaft, stationary guiding elements mounted on said post, and another guiding element on said shaft for cooperating with the elements on said post to control the movements of said scraper while it performs its load discharging functions, said guiding elements serving to protect said baffles from injury by said scraper.

6. In a centrifugal separator, the combination with a basket mounted for rotation about an upright axis, of a scraper for acting on the material in said basket, a shaft supporting said scraper, a bracket in which said shaft is supported for movement to raise and lower said scraper, a stop having threaded engagement with the upper end of said shaft and projecting beyond the sides thereof for limiting the lowering movement of said scraper, and screw threaded means parallel with the axis of said shaft for locking said stop in various positions of adjustment axially of said shaft.

JOHN F. THOLL.